(No Model.) 2 Sheets—Sheet 2.
T. & A. PARRENT.
HAY PRESS.
No. 392,453. Patented Nov. 6, 1888.
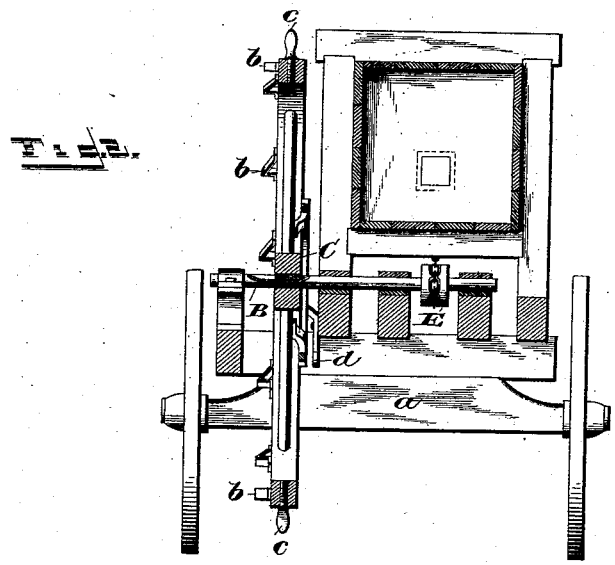
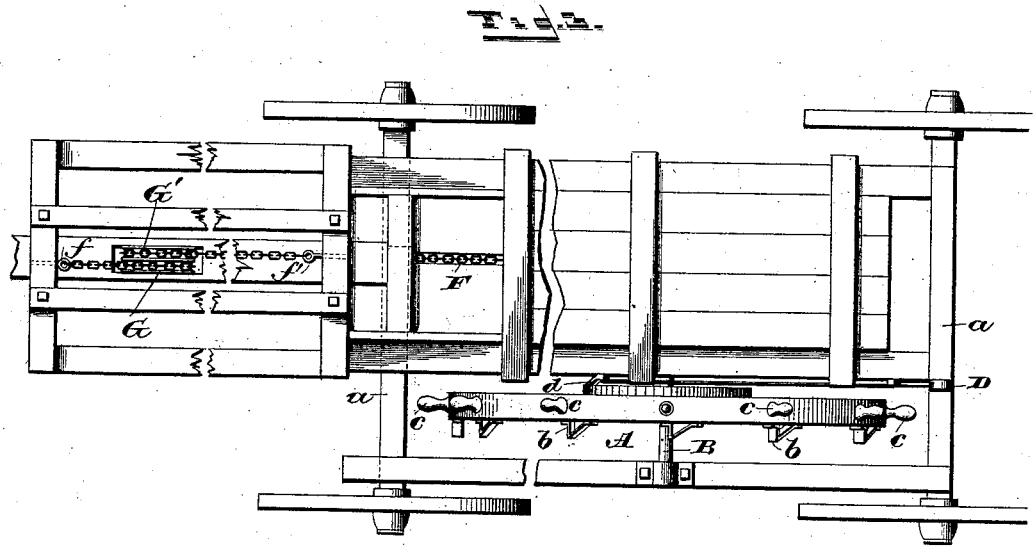
Tousant Parrent.
—and—
Anthony Parrent.
WITNESSES. INVENTOR.

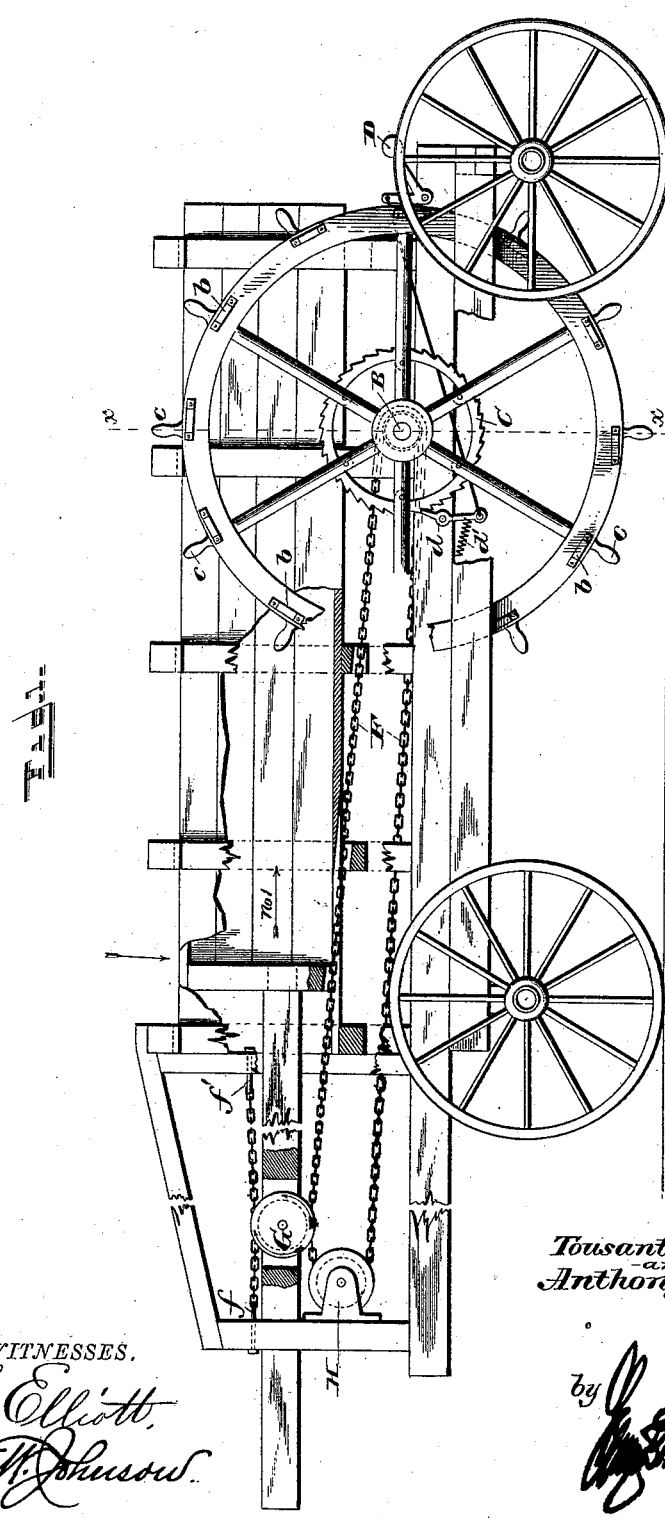

United States Patent Office.

TOUSANT PARRENT AND ANTHONY PARRENT, OF SOMERSET, WISCONSIN.

HAY-PRESS.

SPECIFICATION forming part of Letters Patent No. 392,453, dated November 6, 1888.

Application filed June 7, 1888. Serial No. 276,299. (No model.)

*To all whom it may concern:*

Be it known that we, TOUSANT PARRENT and ANTHONY PARRENT, citizens of the United States of America, residing at Somerset, in the county of St. Croix and State of Wisconsin, have invented certain new and useful Improvements in Hay-Presses; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention relates to certain new and useful improvements in baling-presses, the object of the same being to provide a press which can be readily operated by manual power, so that the plunger can be moved in one direction for pressing the hay and in the other prior to filling the box; and our invention consists in the construction and combination of the parts, as will be hereinafter fully set forth, and specifically pointed out in the claims.

In the accompanying drawings, Figure 1 is a side view, partly broken away, of a hay-press constructed in accordance with our invention. Fig. 2 is a sectional view taken through the line $x$ $x$ of Fig. 1. Fig. 3 is a plan or top view.

Our hay-press is designed to be mounted on wheels, so that it can be readily transported from place to place. The baling-box is mounted to one side of the center of the axles $a$ $a$, to provide a space, A, which is bisected by a shaft, B, upon which is mounted a wheel located within said space, carrying a series of brackets or foot-rests, $b$ $b$, and upon its periphery grip-pins $c$. To the spokes of this wheel is rigidly bolted a ratchet-wheel, C, with which a pawl, $d$, engages, said pawl being suitably pivoted and provided with a spring, $d'$, for throwing the end in engagement with the ratchet-wheel. The lower end of the pawl is connected to a pivoted lever, D, by a rod, so that when said lever is depressed the pawl will be thrown out of engagement with the ratchet-teeth of the wheel C.

The shaft B under the center of the baling-box has rigidly secured thereto a drum, E, over which passes a chain, F. This drum E may be a sprocket-wheel. The chain F is secured to one end of the frame of the press by an eye-bolt, $f$, and passes from said eyebolt around a pulley, G, journaled within a slot in the stem which carries the plunger, and from thence to a pulley, H, mounted in brackets at the end of the frame below the stem of the plunger, and from said pulley around the pulley or sprocket-wheel E, from whence the chain passes around a pulley, G', located adjacent to the pulley G, to an eyebolt, $f'$.

The baling-box may be of ordinary construction, and is provided with an opening, in which the hay or straw to be pressed is inserted, while the rear end thereof has a suitable door for removing the bale.

When the main wheel, located in the space A, is rotated by the operator in the direction indicated by the arrow, the part of the chain which passes around the pulley G' will press the plunger in the direction of the arrow No. 1, so as to press the hay in the box, after which the wheel will be held from rotating by the pawl-and-ratchet wheel while it is being fastened or removed from the box. After the bale has been removed by bearing slightly upon the main wheel the lever D may be depressed to throw the pawl out of engagement with the ratchet-wheel, when the main wheel may be rotated to retract the plunger to a position for filling the baling-box.

In operating the device the operator stands in the rear of the hind axle, so that he can turn the main wheel by drawing upon the same with his hands, and at the same time use his weight to assist him.

We claim—

1. In a baling-press, the combination, with the frame, the power-shaft having a chain drum or wheel, and the plunger, of two pulleys, G and G', mounted on the plunger-stem, an idler carried by the frame in line with one of said pulleys, as G, and a single chain secured at its ends to the frame at opposite sides of the pulleys G G' and passing over said pulleys, the drum, and idler, substantially as described.

2. In a baling-press, the combination, with the frame, the power-shaft having a chain wheel or drum, and the plunger, of two independent pulleys, G and G', mounted on the plunger-stem, an idler carried by the frame in line with pulley G, a single chain secured at its ends to the frame in front and rear of pulleys G and G' and passing thence over said pulleys, the drum, and idler, and a power-wheel secured to the power-shaft and provided on its periphery and side with hand-grips and foot-brackets, substantially as described.

3. In a baling-press, the combination, substantially as described, of the frame, the power-shaft journaled at its ends to the side timbers of said frame, a power-wheel rigidly secured to said shaft and provided with peripheral hand-grips and side foot-brackets, a ratchet-wheel secured to said power-wheel, a spring-pawl pivoted on the frame to engage the teeth of said ratchet-wheel, and a chain and pulleys connecting the power-shaft with the plunger of the press.

In testimony whereof we affix our signatures in presence of two witnesses.

TOUSANT $\overset{\text{his}}{\times}$ PARRENT.

ANTHONY $\overset{\text{mark}}{\text{PARRENT}}$.

Witnesses:
H. A. GRANT,
ERNEST B. REHDER.